U̇nited States Patent Office 3,574,131
Patented Apr. 6, 1971

3,574,131
PROCESS FOR PREPARING RARE EARTH
OXIDE PHOSPHORS
John L. Ferri, Towanda, and James E. Mathers, Ulster,
Pa., assignors to Sylvania Electric Products Inc.
No Drawing. Filed Feb. 4, 1969, Ser. No. 796,551
Int. Cl. C09k 1/10
U.S. Cl. 252—301.4                    9 Claims

ABSTRACT OF THE DISCLOSURE

A process for increasing and controlling the particle size of a rare earth oxide phosphor is disclosed. The process comprises forming a mixture of a fluxing agent and a rare earth source in weight ratios of from about 4:96 to about 25:75, raising the temperature of the mixture to at least about 1100° C. and holding the mixture above about 1100° C. for a sufficient time to form a rare earth oxide phosphor having a particle size of at least about 4 microns. The fluxing agents suitable are the alkali metal hydrogen sulfates, alkali metal pyrosulfates and mixtures thereof. The particle size of the phosphor material is dependent upon the amount of fluxing agent used within the suitable ratio of fluxing agent to rare earth source.

BACKGROUND OF THE INVENTION

This invention relates to rare earth oxide phosphors. More particularly it relates to a process for increasing and controlling the particle size of the rare earth oxide phosphors.

Rare earth oxide phosphors, such as lanthanum oxide, yttrium oxide, gadolinium oxide and the mixed crystal yttrium-gadolinium oxide when activated by certain other rare earth ions such as europium, terbium and the like, are extremely bright phosphors. When produced by conventional techniques, that is by precipitating insoluble rare earth salts, such as the rare earth oxalates, and converting the salts to the rare earth oxides by the application of heat, the phosphors have a large portion of their particles below about 2 microns. Because of the small particle size it is generally necessary to use the "slurry technique" for applying the phosphors in the patterns required on the viewing panel or screen. In the "slurry technique" the phosphors are mixed with a photosensitive material and deposited upon the panel in form of a slurry. It has been discovered that during the slurry process the phosphors lose some of their brightness probably because the chemical sensitizer used in the photosensitive material reacts with the phosphor.

The dry deposition technique of applying phosphors to viewing panels is well known and is described in U.S. Patent 3,025,161. This method overcomes the problem of the dulling of the brightness of the phosphors, however, some cross-contamination between the red, green, and blue emitting phosphors occurs when the phosphors have a large portion of the particles below 2 microns.

As a result of the foregoing problems in applying the rare earth oxide phosphors, although their colors are brighter than most of the other red-emitting phosphors, these materials have not had wide acceptance in the color television industry.

The beforementioned dusting technique can be used satisfactorily with phosphors having an average particle size of from about 4 to about 25 microns. A process for producing a rare earth oxide phosphor having a large enough particle size to enable the dusting technique to be used would enable the rare earth oxide phosphors to be used in a color television tube without the loss of brightness that occurs when the materials are applied via the slurry technique. Such a process, it is believed, would be an advancement in the art.

SUMMARY OF THE INVENTION

In accordance with one aspect of this invention, there is provided a process for increasing and controlling the particle size of the rare earth oxide phosphor. The process comprises (a) forming a mixture of a rare earth source and a fluxing agent selected from the group consisting of alkali metal hydrogen sulfates, alkali metal pyrosulfates and mixtures thereof, having a weight ratio of the fluxing agent to the rare earth oxide being from about 4:96 to about 25:75; (b) raising the temperature of said mixture from atmospheric temperature to at least about 1100° C. and (c) holding the temperature of said mixture above at least about 1100° C. for a time sufficient to form a rare earth oxide phosphor having an average particle size of at least about 4 microns.

For a better understanding of the present invention, together with other and further objects, advantages and capabilities thereof, reference is made to the following disclosure and appended claims in connection with the above description of some of the aspects of the present invention.

DESCRIPTION OF THE PREFERRED EMBODIMENTS

The particle size of the useful rare earth oxide phosphors can be increased and controlled by the process of this invention. It is to be noted that within the context of the present invention yttrium is considered as a rare earth since it behaves in a similar manner to certain other rare earth materials such as gadolinium and lanthanum. The rare earth oxide phosphors that can receive the benefits of the present invention are yttrium oxide, gadolinium oxide, lanthanum oxide and mixed crystal rare earth oxides such as the yttrium-gadolinium oxide $(Y_{0.15}Gd_{0.85})_2O_3$. The term "rare earth oxide phosphor" as used herein means that the phosphor contains oxides of either yttrium, gadolinium, lanthanum or mixtures thereof. The term "rare earth source" encompasses those compounds that are either oxides of the foregoing rare earths and those compounds that are converted to rare earth oxides upon heating and that comprise the host and the activator in the phosphor.

As is known in the art, the rare earth oxides are activated by other rare earth ions to give an emission of a particular color when subjected to excitation, such as by cathode rays. For example, europium and samarium-activated rare earth oxides emit a very bright red. Terbium-activated rare earth oxide phosphors emit in the green. Generally, such activators are used in amounts of from about 0.001 mole to about 0.5 mole of activator per mole of rare earth oxide. Other ions in relatively minor amounts, such as bismuth, cerium, lutetium, calcium, strontium and the like can be incorporated in the phosphor to modify various properties of the phosphor e.g. to control brightness, cause a color shift, to effect decay characteristics and the like. These additives when used are generally employed in amounts of less than about 0.01 moles/mole of phosphor. The benefits of the present invention are achieved in phosphors containing these additives.

The fluxing agents that can be used in the practice of the present invention are the alkali metal hydrogen sulfates, the alkali metal pyrosulfates and mixtures thereof, and of these potassium is preferred as the alkali metal.

The fluxing agents can be added to the rare earth salts that are to be converted to the oxides before or after the rare earth oxides are formed. It is necessary that a mixture of a rare earth source and the fluxing agent be formed and thereafter the temperature of the mixture is raised to at above about 1100° C. (the firing temperatures normally used to convert the salts to rare earth oxide phosphors) and held at that temperature for a time sufficient to form a rare earth oxide phosphor having an average particle size of above about 4 microns and preferably from about 4 to about 25 microns as measured by the Fisher Sub Sieve Sizer (FSSS). For example, the fluxing agents can be incorporated in desired amounts into mixtures containing rare earth sources, such as the rare earth oxalates, that are converted to the oxides during heating. After heating for a time and temperatur sufficient to convert the rare earth sources to the oxides, the particle sizes are in the desired range. Additionally, a mixture of the fluxing agents and the rare earth oxides can be formed and the mixture can be heated at above 1100° C. for about 2 hours and the desired particle size is achieved.

As was previously mentioned, the weight ratio of fluxing agent to the rare earth source (including the rare earth activators but not other additives such as bismuth, lutetium and the like) will be from about 4:96 to about 25:75. The particle size of the resulting phosphor is primarily dependent upon the amount of fluxing agent that is used. When the foregoing weight ratios of fluxing agent to rare earth source are used, the approximate average particle size can be predicted reasonably accurately from the following formula:

Percent by weight of fluxing agent added
=particle size in microns

Some variations from the above formula will occur dependent upon several factors, such as the temperatures used and the method used to incorporate the fluxing agent. The temperature at which the fluxing occurs is known to have some effects, and within the temperature ranges used, higher temperatures tend to increase the particle size of the phosphor. In most instances, a temperature of from about 1100° C. to 1500° C. will be used, with a range of from about 1200° C. to about 1250° C. preferred. When the temperature is kept within the preferred range the foregoing formula gives an accurate approximation of the resulting particle size as is shown in Table I in Example III.

To more fully illustrate this invention, the following non-limiting examples are presented. All parts, proportions and percentages are by weight unless otherwise indicated.

Example I

About 21.5 parts of yttrium oxide and about 1.58 parts of europium oxide are dissolved in about 92.8 parts of a 50% aqueous nitric acid solution. About 85 parts of an aqueous oxalic acid solution having a concentration of 78 grams of oxalic acid per 100 ml. of solution are added. The temperature of the solution is held at about 60° C. and a yttrium-europium oxalate precipitate is formed. The precipitate is removed by filtration, washed with deionized water and dried at about 110° C. The dried yttrium-europium oxalate is blended with about 5.15 parts of potassium pyrosulfate, $K_2S_2O_7$, and then slowly heated to about 1250° C. and held for about 2 hours.

The particle size of the phosphor is about 20 microns. Material produced by essentially the same method except without the use of a fluxing agent has an average particle size of about 2.2 microns with an appreciable amount below about 2 microns.

Substantially similar results are achieved when gadolinium oxide is substituted in essentially stoichiometrically equivalent amounts for yttrium oxide in the above process.

Example II

Essentially the same procedure is used as in Example I to form the dried yttrium-europium oxalates. After drying, the oxalates are heated at 1000° C. for about one hour to convert the oxalates to the oxides. A sample of the material has an average particle size of about 2 microns. The oxides are then blended with potassium pyrosulfate in about a 7:1 weight ratio and the mixture is heated for about 2 hours at 1250° C. Particle size analysis of a sample of the material indicate that the average particle size has been increased to about 6.8 microns (FSSS).

Example III

Essentially the same procedure is followed as in Example II except that the weight ratio of the oxide to the fluxing agent is varied from about 95:5 to about 80:20. Additional phosphors are made by following essentially the same procedure except that potassium hydrogen sulfate is used as the fluxing agent. Table I indicates the particle size analysis of the materials after heating the mixtures for about 2 hours at about 1250° C.

TABLE I

| Sample: | Fluxing agent | Oxide to flux ratio | Particle size (microns, FSSS) |
|---|---|---|---|
| 1 | None | | 2.2 |
| 2 | $KHSO_4$ | 95:5 | 4.4 |
| 3 | $KHSO_4$ | 90:10 | 7.1 |
| 4 | $KHSO_4$ | 85:15 | 14.0 |
| 5 | $KHSO_4$ | 80:20 | 20.0 |
| 6 | $K_2S_2O_7$ | 95:5 | 3.9 |
| 7 | $K_2S_2O_7$ | 90:5 | 6.8 |
| 8 | $K_2S_2O_7$ | 85:5 | 16.0 |
| 9 | $K_2S_2O_7$ | 80:20 | 22.0 |

While there have been shown and described what are at present considered the preferred embodiments of the invention, it will be obvious to those skilled in the art that various changes and modifications may be made therein without departing from the scope of the invention as defined by the appended claims.

We claim:
1. A process useful in the production of a rare earth oxide phosphor comprising:
    (a) forming a mixture of a first rare earth compound which is converted to a rare earth oxide phosphor host material upon heating, a second rare earth compound which is converted to a rare earth oxide phosphor activator material upon heating, and a fluxing agent selected from the group consisting of alkali metal hydrogen sulfates, alkali metal pyrosulfates and mixtures thereof, the weight ratio of said fluxing agent to said rare earth source being from about 4:96 to about 25:75;
    (b) raising the temperature of said mixture to at least about 1100° C.; and
    (c) holding the temperature of said mixture above about 1100° C. for about 2 hours sufficient to form a rare earth oxide phosphor having an average particle size of at least about 4 microns.
2. A process according to claim 1 wherein said alkali metal is potassium.
3. A process according to claim 2 wherein said average particle size is from about 4 to about 25 microns.
4. A process according to claim 3 wherein said temperature is from about 1200° C. to about 1250° C.
5. A process according to claim 4 wherein said rare earth is selected from the group consisting of yttrium, gadolinium, lanthanum and mixtures thereof.
6. A process according to claim 5 wherein said first rare earth compound is selected from rare earth oxides, rare earth oxalates and mixtures thereof.
7. A process according to claim 6 wherein said rare earth oxide phosphor host material is yttrium oxide.
8. A process according to claim 7 wherein said rare earth oxide phosphor host material is gadolinium oxide.
9. A process according to claim 8 wherein said rare earth oxide phosphor host material is a mixed crystal yttrium-gadolinium oxide.

References Cited

UNITED STATES PATENTS 3,457,184  7/1969  Kobayashi et al. ____ 252—301.4
3,458,451  7/1969  Kobayashi et al. ____ 252—301.4

ROBERT D. EDMONDS, Primary Examiner